United States Patent [19]

Susnjara

[11] Patent Number: 4,899,644

[45] Date of Patent: Feb. 13, 1990

[54] FLUID CYLINDER ASSEMBLY FOR ROBOT ACTUATORS

[75] Inventor: Kenneth J. Susnjara, Santa Claus, Ind.

[73] Assignee: Thermwood Corporation, Dale, Ind.

[21] Appl. No.: 244,603

[22] Filed: Sep. 14, 1988

Related U.S. Application Data

[63] Continuation of Ser. No. 853,610, Apr. 18, 1986, abandoned.

[51] Int. Cl.⁴ .............................................. F15B 15/26
[52] U.S. Cl. .................................... 92/18; 92/5 R;
 92/21 R; 92/21 MR; 901/4; 901/22; 403/260;
 403/322; 403/328; 279/23 R; 279/29; 279/79
[58] Field of Search ............... 92/19, 29, 85 R, 65,
 92/20, 21 R, 18, 22–27, 29; 403/5, 11, 328, 259,
 260, 261, 326, 327, 321, 322, 325, 315, 328;
 279/23 R, 29, 79, 57; 901/4, 22; 364/513

[56] References Cited

U.S. PATENT DOCUMENTS

| 3,498,188 | 3/1970 | Rodriguez | 92/29 |
| 3,569,903 | 3/1971 | Brishka | 403/321 |
| 4,585,369 | 4/1986 | Manesse et al. | 403/322 |
| 4,604,009 | 8/1986 | Tennerstedt | 279/57 |

FOREIGN PATENT DOCUMENTS

| 0872718 | 2/1953 | Fed. Rep. of Germany | 279/78 |
| 872718 | 3/1953 | Fed. Rep. of Germany | 279/78 |
| 873342 | 11/1953 | Fed. Rep. of Germany | 279/78 |
| 0039250 | 3/1977 | Japan | 364/513 |
| 0051172 | 4/1979 | Japan | 901/4 |

Primary Examiner—Robert E. Garrett
Assistant Examiner—Thomas Denion
Attorney, Agent, or Firm—Lalos & Keegan

[57] ABSTRACT

A fluid cylinder assembly comprising a fluid cylinder having ports disposed at opposite ends thereof communicable with a source of fluid under pressure; a piston disposed in said cylinder having a first rod section extending through an end of said cylinder, extendable and retractable relative to said cylinder, the first piston rod section having an axial bore, a second piston rod section having a guide portion disposed in the axial bore of the first piston rod section and axially displaceable relative the first piston rod section, and means for detachably locking the first piston rod section to the second piston rod section.

15 Claims, 3 Drawing Sheets

FLUID CYLINDER ASSEMBLY FOR ROBOT ACTUATORS

This is a continuation of Ser. No. 853,610, filed 4/18/86, now abandoned.

This invention relates to industrial robots and more particularly to a novel method and apparatus for disconnecting the drive means of a robot actuator to allow movement of the various movable components of the actuator without the need to operate or move the drive means.

One particular type of industrial robot used in the prior art generally consists of a support unit, a base unit mounted on the support unit and rotatable about a vertical axis, a lower arm assembly mounted on the rotatable base unit for pivotal movement about a first horizontal axis, an upper arm member mounted on the upper end of the lower arm member for pivotal movement about a second horizontal axis, and a tool supporting member universally connected to the free end of the upper arm member through a wrist assembly. Movement of the members with respect to each other generally is accomplished by drive means which may be powered by fluid under pressure, electric motors, air under pressure or other means.

One method of programming the movements required of such a robot requires deactivating the drive means and moving the operative members of the robot by hand through a sequence of desired movements. Sensors located on the various axes of the robot provide position information to a control system during the programming movements. Such position information transmitted to the control system of the robot formulates the operating program for the robot.

Typically, during the programming procedure, the drive means remain operable which makes the movement of the components more difficult. Accordingly, it is desirable to disconnect such drive means during programming. Prior art methods of disconnecting the drive means during programming, however, have been found to require complex equipment designs, expensive manufacturing and less than satisfactory performance. It thus has been found to be desirable to provide an improved method and apparatus for disconnecting the drive means of industrial robots during programming procedures.

Accordingly, it is the principal object of the present invention to provide an improved means for disconnecting the drive means of industrial robots.

Another object of the present invention is to provide an improved means for disconnecting the drive means of industrial robots for programming purposes which is effective in maintaining proper alignment of the components and supplying acurate position data to the control system both when the drive means is connected and when the drive means is disconnected.

A further object of the present invention is to provide an improved means for disconnecting the drive means of industrial robots which is simple in design, comparatively inexpensive to manufacture and highly effective in performance.

Other objects and advantages of the present invention will become more apparent to those person having ordinary skill in the art to which the present invention pertains from the following description taken in conjunction with the accompanying drawings, wherein.

Figure 1:
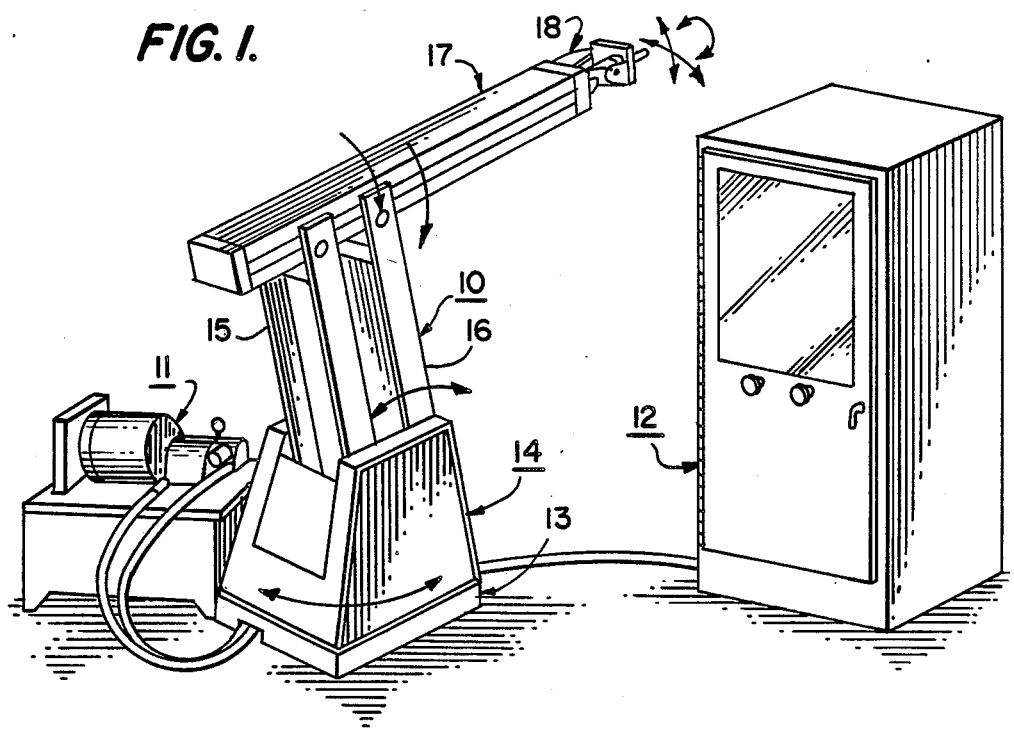
FIG. 1 is a perspective view of an industrial robot system utilizing the present invention.

Referring to FIG. 1, there is illustrated an industrial robot system for performing work functions on a workpiece which generally consists of a robot actuator 10, a source of hydraulic fluid under pressure 11 and a unit 12 for controlling the motions of the robot actuator. Generally, the robot actuator consists of a stationary support unit 13, a base unit 14 mounted on the support unit and adapted to rotate about a vertical axis, a pair of lower sets of the arm members 15 and 16 mounted at their lower ends to base unit 14 for pivotal movement about a pair of lower horizontal axes, an upper arm member 17 mounted on the upper ends of arm sets 15 and 16 for pivotal movement about a pair of upper horizontal axes, and a wrist assembly 18 mounted on a free end of the upper arm member.

Figure 2:
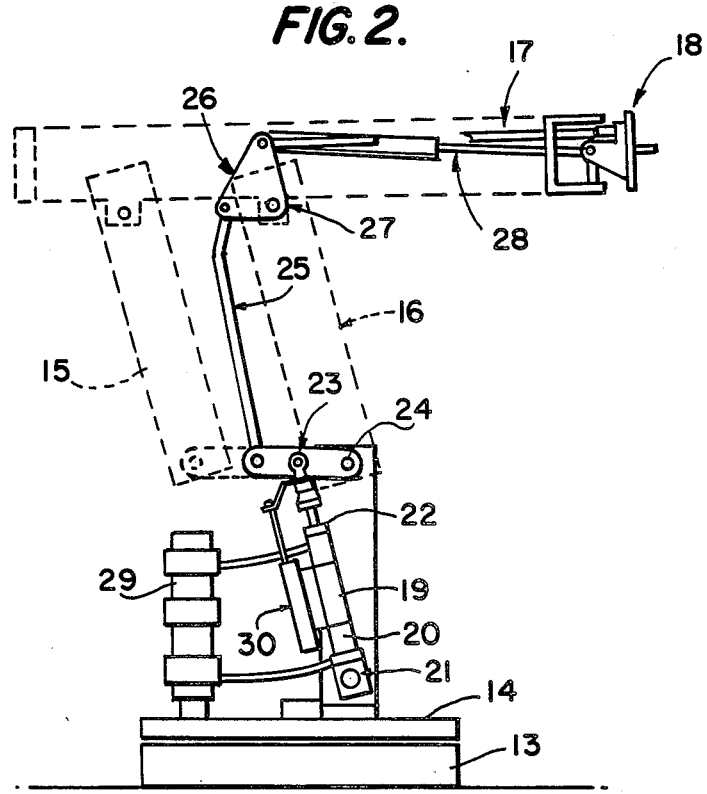
FIG. 2 is a side elevational view of the robot shown in FIG. 1, having portions thereof broken away.

As best shown in FIG. 2, the movements of lower arm members 15 and 16, upper arm members 17 and wrist assembly 18 are actuated by a set of fluid cylinder assemblies which are operatively connected to the lower arm members, the upper arm member and the wrist assembly through various linkages. Illustrative of one of such arrangements is a fluid cylinder assembly 19 having a cylinder 20 pivotally connected to base member 14 as at 21, and a piston rod 22 pivotally connected to a lever 23 pivotally connected to the base member as at 24. Motion of lever 23 is transmitted to the wrist assembly for positioning a working tool mounted on the wrist assembly by means of a link 25, a crank 26 pivotally connected to lower arm member 16 as at 27 and a control rod 28 operatively connecting crank 26 and a component of the wrist assembly.

Power unit 11 is of a conventional, commercially available type, including an oil reservoir, motor, pump, filter and appropriate controls. The power unit supplies fluid under pressure to the robot actuator through valve and manifold assembly 29.

Control unit 12 includes a microprocessor computer which functions in the conventional manner in comparing the actual positions of the working tool with the program positions, determining the position errors and correspondingly generating command signals to selected valves controlling the fluid cylinders for correcting the errors. The positions of the components of the robot actuator are sensed by linear potentiometers 30 mounted directly o the fluid cylinder assemblies.

In programming the computer, the working tool mounted on the wrist assembly is physically moved through a sequence of desired motions. Under such conditions, the various potentiometers of the robot actuator generate a sequence of position signals which function to program the computer.

Figure 3:
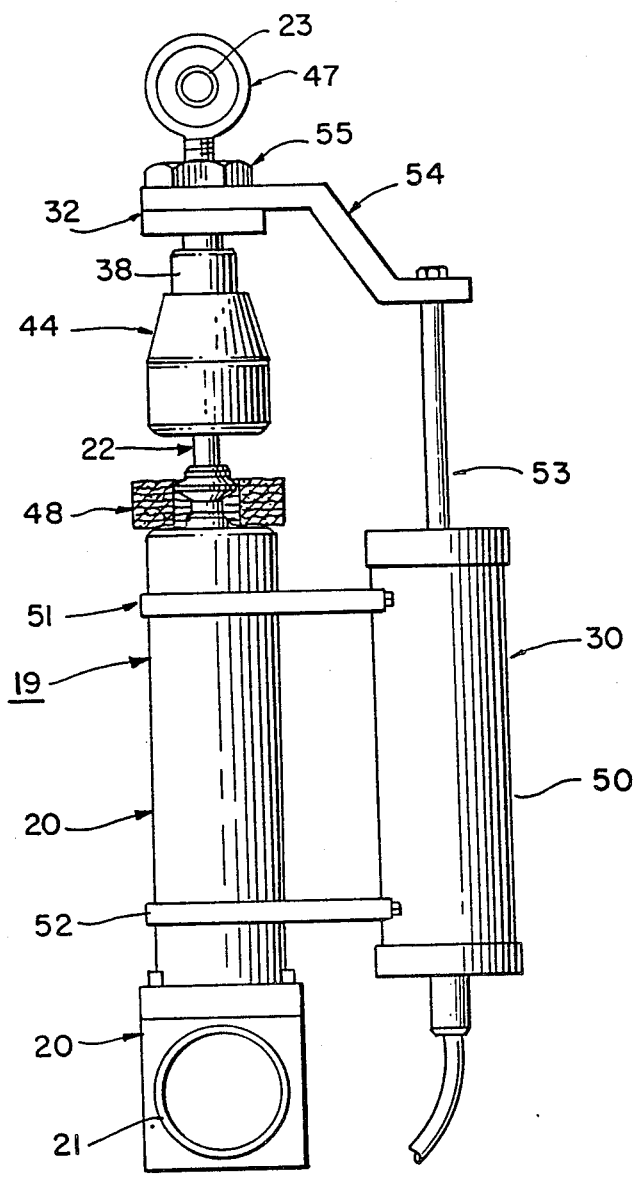
FIG. 3 is an enlarged side, elevational view of a fluid cylinder assembly utilized in the robot shown in FIGS. 1 and 2, embodying the present invention.
Figure 4:
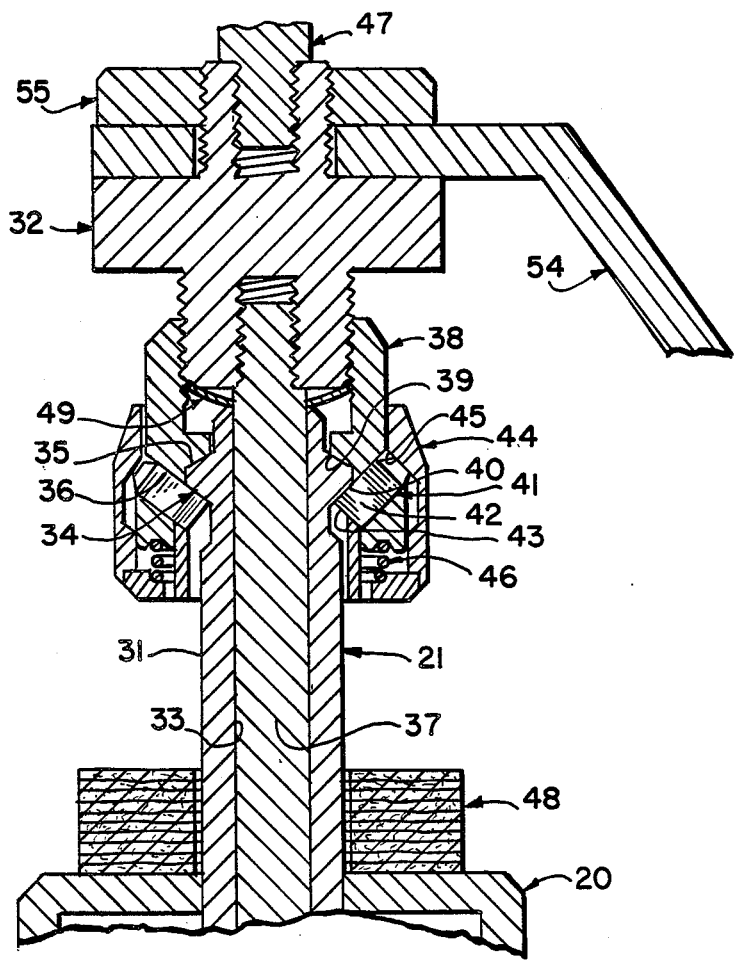
FIG. 4 is an enlarged, vertical cross-sectional view of a portion of the assembly shown in FIG. 3.

Referring to FIGS. 3 and 4, piston rod 22 includes a rod section 31 connected to the head portion of the piston rod and extending through an axially disposed opening in the end wall of the cylinder, and a rod section 32. Rod section 31 is provided with an axially disposed bore 33 and an annular, protruding portion 34 providing an upper beveled surface 35 and a lower beveled surface 36. Rod section 32 is provided with a guide portion 37 which is received within axial bore 33. Guide portion 37 is axially displaceable relative to rod section 31 and functions to maintain rod section 32 and rod section 31 in axial alignment.

Threadedly mounted on the lower end of rod section 32 is a carrier member 38 having an annular, beveled surface 39 upon which annular beveled surface 35 of protrusion 34 may be seated, and a plurality of openings 40 which are disposed at acute angles relative to the axis of piston rod 21. Disposed in openings 40 is a set of detents 41 which are displaceable inwardly and outwardly. Each of such detents has a cylindrical surface 42 engageable with annular beveled surface 36 of rod section 31, when displaced inwardly, and an end surface 43 which may be engaged by annular beveled surface 35 of rod section 31.

Mounted on carrier member 38 is a retainer member 44 having an annular, beveled surface 45 engaging the outer ends of detents 41. Beveled surface 41 of the retainer member is yieldingly biased against detents 41 to urge them in their extended positions by means of a coil spring 46 interposed between a bottom surface of carrier member 38 and retainer member 44.

In the condition shown in FIG. 4, rod section 31 will be locked to rod section 32 so that when fluid under pressure is supplied to opposite ends of cylinder 20, the rod sections will move together in extending and retracting to transmit motion through a connecting element 47 to a component of the actuator. Whenever, however, it is desired to disconnect the component of the robot actuator from the fluid cylinder as when it is desired to physically move the component through a sequence of motions to program the computer, the component of the fluid cylinder to be disconnected is physically moved to cause rod 21 to retract and cause retainer member 44 to engage a compression pad 48 mounted in the end wall of the cylinder. As the rod continues to retract, the engagement of retainer member 44 with compression pad 48 will cause retainer member 44 to ride up on carrier member 38 against the action of coil spring 46 thus permitting annular beveled surface 36 to cam the detents outwardly and thus allow annular protrusion 34 to ride pass the retracted detents and release rod section 32 from rod section 31. Under such conditions, the component to which rod section 32 is connected will be free to move easily to permit programming of the computer. Alignment of the rod section 32 with rod section 31 during the programming operations will be maintained by guide portion 37 which slides freely within axial bore 33. The cushioning effect of compression pad 48 allows annular protrusion 34 to ride passed detents 41 without allowing the detents to extend and relock rod section 31 to rod section 32.

When the programming procedure has been completed and it is desired to reconnect the component to the fluid cylinder to operate the robot actuator, rod section 32 merely is retracted toward the cylinder until annular beveled surface 35 of protrusion 34 engages end surfaces 43 of the detents. As retraction continues, beveled surface 35 will cam detents 41 into their retracted positions to permit protrusion 34 to ride past the detents into the position as shown in FIG. 4. Under such conditions, annular beveled surface 35 of protrusion 34 will be seated on annular beveled surface 39 of retainer member 38 and detents 41 will be caused to extend so that their cylindrical surfaces 42 will engage annular beveled surface 36 of protrusion 34, in locking relation.

A positive seating of protrusion 34 on detents 41 is assured by a spring washer 49.

When piston rod 21 is in the condition as shown in FIG. 4, the force provided by spring 46 is sufficient to maintain detents 41 in their extended, locking positions so that there will be no play between rod section 31 and rod section 32 which otherwise would have a detrimental effect on the operation of the robot. To overcome the force of spring 46 in order to disconnect the component being actuated by the fluid cylinder, from the fluid cylinder, the rod would have to be retracted with sufficient force to engage compression pad 48 and overcome the force of spring 46.

As best shown in FIG. 3 linear potentiometer 30 is provided with a main body portion 50 rigidly secured to cylinder 20 by means of a pair of brackets 51 and 52, and a slide element 53 rigidly secured to rod section 32 by means of a bracket 54 secured to rod section 32 by means of a retaining nut 55. It will be appreciated that as rod section 32 is extended or retracted, whether connected to rod section 31 or not, slide element 53 will be displaced correspondingly to sense the position of the component to which the fluid assembly is operatively connected, for sensing the position of the component during either programming of the computer or operating the actuator.

It further will be appreciated that disconnection of the rod of the fluid cylinder can be accomplished either by retracting the rod by supplying fluid under pressure to the rod end of the cylinder or by physically moving the retainer member down into contact with the compression pad. It also should be noted that the linkage operated by the fluid cylinder can be designed so that during normal operation of the robot actuator, the rod of the fluid cylinder will not be retracted sufficiently to cause it to engage the compression pad and inadvertently cause disconnection.

From the foregoing detailed description, it will be evident that there are a number of changes, adaptations and modifications of the present invention which come within the province of those persons having ordinary skill in the art to which the aforementioned invention pertains. However, it is intended that all such variations not departing from spirit of the invention be considered as within the scope thereof as limited solely by the appended claims.

I claim:

1. A drive assembly for a robot actuator, comprising:
   a fluid cylinder;
   a piston slidably disposed within said fluid cylinder having a piston rod extending through an end of said fluid cylinder, said piston rod having a first section;
   a linear potentiometer positioned adjacent to said fluid cylinder, said linear potentiometer having a slide element movable relative to said fluid cylinder along a path substantially parallel to a path of movement of said first rod section, said slide element being connected to the robot actuator to sense the position of said robot actuator relative to said drive assembly; and
   connection means for detachably connecting said first rod section to the robot actuator so that said first rod section can be disconnected from the robot actuator while said slide element remains connected to the robot actuator to allow movement of the actuator without the need to operate or move the drive assembly while the linear potentiometer remains operative to detect relative movement of the robot actuator, whereby said linear potentiometer senses the position of said robot actuator when said actuator is connected to said drive assembly and also when disconnected from said drive assembly.

2. An assembly according to claim 1, including guide means for maintaining linear movement of said slide element parallel to the path of movement of said first rod section after said first rod section has been disconnected from the robot actuator in said guide 3. An assembly according to claim 2, where means is defined by said piston rod including a second rod section with said first rod section having an axially disposed bore, said second rod section having a guide portion axially displaceable within said bore for maintaining said first and second rod sections in axial alignment.

4. An assembly according to claim 3, wherein said connection means is a means for detachably connecting said first and second rod sections together.

5. An assembly according to claim 4 wherein said connecting means are operable to lock said rod sections together upon a first predetermined axial displacement of said rod sections relative to each other.

6. An assembly according to claim 5 wherein said connecting means are operable to unlock said rod sections from each other upon a second predetermined axial displacement of said rod sections relative to said cylinder.

7. An assembly according to claim 4 wherein said connecting means include detent means mounted on said second rod section operatively engageable with said first rod section.

8. An assembly according to claim 7, wherein said detent means are operable to lock said first and second rod sections together upon a first predetermined axial displacement of said rod sections relative to each other.

9. An assembly according to claim 8, wherein said detent means are operable to release said first and second rod sections from each other upon a second predetermined axial displacement of said rod sections relative to said cylinder.

10. An assembly according to claim 7, wherein said detent means include at least one detent mounted on said second rod section and movable between locking and unlocking engagement with said first rod section, a retainer mounted on said second rod section, displaceable axially, said retainer having camming means engageable with said detent operable upon axial displacement of said retainer relative to said second rod section in opposite directions to urge said detent into a extended position and locking engagement with said first rod section, said retainer having means for biasingly displacing said retainer and said second rod section in opposite directions for urging said detent into an extended position.

11. An assembly according to claim 10, including a surface on said fluid cylinder engageable by said retainer when said rod is retracted to displace said retainer relative to said second rod section, in opposite directions, to allow said detent to retract.

12. An assembly according to claim 11, wherein said first rod section includes a protrusion engageable with a first surface of said detent for causing said detent to be retracted upon displacement of said first and second rod sections in opposite directions, and disposable between said detent and said second rod section for locking said rod sections together.

13. An assembly according to claim 11, including a compressible pad mounted on said cylinder and engageable by said retainer when said rod sections are retracted into said cylinder.

14. A fluid cylinder assembly, comprising:
   a fluid cylinder having ports disposed at opposite ends thereof communicable with a source of fluid under pressure;
   a piston disposed in said fluid cylinder having a rod extending through an end thereof, extendable and retractable relative to said fluid cylinder, said piston rod having a first section connected to said piston disposed within said fluid cylinder and extending through an opening in an end thereof and a second section, said first rod section having an axially disposed bore, said second rod section having a guide portion axially displaceable within said bore for maintaining said rod sections in axial alignment; and
   means for detachably locking said rod sections together, said locking means including detent means mounted on said second rod section operatively engageable with said first rod section, said detent means including at least one detent mounted on said second rod section and movable between locking and unlocking engagement with said first rod section, a retainer mounted on said second rod section, displaceable axially, said retainer having camming means engageable with said detent operable upon axial displacement of said retainer relative to said second rod section in opposite directions to urge said detent into an extended position and locking engagement with said first rod section, said retainer having means for biasingly displacing said retainer and said second rod section in opposite directions for urging said detent into an extended position, said fluid cylinder including a surface engageable by said retainer when said rod is retracted to displace said retainer relative to said second rod section, in opposite directions, to allow said detent to retract, said cylinder including a compressible pad and engageable by said retainer when said rod section are retracted into said cylinder.

15. A drive assembly for a robot actuator, comprising:
   a fluid cylinder;
   a piston slidably disposed within said fluid cylinder having a piston rod extending through an end of said fluid cylinder, said piston rod having a first section;
   a linear potentiometer positioned adjacent to said fluid cylinder, said linear potentiometer having a slide element movable relative to said fluid cylinder along a path substantially parallel to a path of movement of said first rod section, said slide element being connected to the robot actuator when assembled,
   connection means for detachably connecting said first rod section to the robot actuator so that said first rod can be disconnected from the robot actuator while said slide element remains connected to the robot actuator to allow movement of the actuator without the need to operate or move the drive assembly while the linear potentiometer remains operative to detect relative movement of the robot actuator, including guide means for maintaining linear movement of said slide element parallel to the path of movement of said first rod section after said first rod section has been disconnected from the robot actuator, wherein said guide means is defined by said piston rod including a second rod section with said first rod section having an axially disposed bore, said second rod section having a guide portion axially displaceable within said bore for maintaining said first and second rod sections in axial alignment, wherein said connection means is a means for detachably connecting said first and second rod sections together, wherein said locking means include detent means mounted on said second rod sections operatively engageable with said first rod section, wherein said detent means include at least one detent mounted on said second rod section and movable between locking and unlocking engagement with said first rod section, a retainer mounted on said second rod section, displaceable axially, said retainer having camming means engageable with said detent operable upon axial displacement of said retainer relative to said second rod section in opposite directions to urge said detent into an extended position and locking engagement with said first rod section, said retainer having a means for biasingly displacing said retainer and said second rod section in opposite directions for urging said detent into an extended position, including a surface on said fluid cylinder engageable by said retainer when said rod is retracted to displace said retainer relative to said second rod section, in opposite directions, to allow said detent to retract, and including a compressible pad mounted on said cylinder and engageable by said retainer when said rod sections retracted into said cylinder.

* * * * *

UNITED STATES PATENT AND TRADEMARK OFFICE
CERTIFICATE OF CORRECTION

PATENT NO.   :   4,899,644

DATED        :   February 13, 1990

INVENTOR(S)  :   Kenneth J. Susnjara

It is certified that error appears in the above-identified patent and that said Letters Patent is hereby corrected as shown below:

Claim 2, line 5, delete "in said guide".

Claim 3, line 1, delete "where" and insert
--wherein said guide--.

Signed and Sealed this

Twenty-seventh Day of November, 1990

Attest:

HARRY F. MANBECK, JR.

*Attesting Officer*       *Commissioner of Patents and Trademarks*